US012579182B2

(12) United States Patent
Farnan et al.

(10) Patent No.: US 12,579,182 B2
(45) Date of Patent: Mar. 17, 2026

(54) STRUCTURED DOCUMENT GENERATION USING DIFFERENT EMBEDDING SPACE REGIONS

(71) Applicant: Capital One Services, LLC, McLean, VA (US)

(72) Inventors: Tyler Farnan, San Diego, CA (US); Jeremy Goodsitt, Champaign, IL (US); Justin Mullen, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 200 days.

(21) Appl. No.: 18/596,206

(22) Filed: Mar. 5, 2024

(65) Prior Publication Data

US 2025/0284729 A1      Sep. 11, 2025

(51) Int. Cl.
| | |
|---|---|
| *G06F 7/00* | (2006.01) |
| *G06F 16/332* | (2019.01) |
| *G06F 16/35* | (2019.01) |
| *G06F 16/383* | (2019.01) |
| *H04L 12/18* | (2006.01) |

(52) U.S. Cl.
CPC ........ *G06F 16/383* (2019.01); *G06F 16/3322* (2019.01); *G06F 16/35* (2019.01); *H04L 12/1831* (2013.01)

(58) Field of Classification Search
CPC ............. G06F 16/3347; G06F 16/3344; G06F 16/332; G06F 16/3322; G06F 16/35; G06F 16/24542; G06F 16/2455; G06F 16/24522; G06F 16/2425; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/383; G06F 16/285; G06F 16/9535; G06F 16/3329; G06F 16/90332; G06F 16/90335; G06F 16/217; G06F 16/353; G06F 40/288; G06F 40/289; G06F 40/295; G06F 40/242; G06F 40/40; G06F 40/30; G06F 40/205; G06F 40/105; G06F 40/106; G06F 40/186; G06F 40/211; H04L 12/1831
See application file for complete search history.

(56) References Cited

U.S. PATENT DOCUMENTS

| | | | | |
|---|---|---|---|---|
| 10,621,552 | B1 * | 4/2020 | Syed .................... | G06Q 10/103 |
| 11,461,668 | B1 * | 10/2022 | Mohandas ............... | G06N 3/08 |

(Continued)

*Primary Examiner* — Mohammad A Sana
(74) *Attorney, Agent, or Firm* — Foley & Lardner LLP

(57) ABSTRACT

A method and related system for generating a document using different portions of an embedding space includes obtaining a related document based on a first text, generating first vectors in an embedding space based on the first text and second vectors in the embedding space based on the related document, and determining a first region in the embedding space based on the first vectors and a second region in the embedding space based on the second vectors. The method further includes generating a first portion of a structured document based on the first vectors and third vectors in a third region within the first region but not within the second region. The method further includes generating a second portion of the structured document based on the first and second vectors and the first portion of the structured document.

20 Claims, 3 Drawing Sheets

(56) References Cited

U.S. PATENT DOCUMENTS

| | | | |
|---|---|---|---|
| 11,769,017 B1 * | 9/2023 | Gray | G06F 40/56 |
| | | | 704/9 |
| 2012/0323572 A1 * | 12/2012 | Koll | G16Z 99/00 |
| | | | 704/235 |
| 2022/0318678 A1 * | 10/2022 | Kranski | G06N 20/00 |
| 2023/0229847 A1 * | 7/2023 | Rosedale | G06F 40/284 |
| | | | 715/243 |
| 2025/0005303 A1 * | 1/2025 | Gray | G06F 40/56 |

* cited by examiner

100

STRUCTURED DOCUMENT GENERATION USING DIFFERENT EMBEDDING SPACE REGIONS

SUMMARY

The prevalence and increasing capabilities of generative language models promise tantalizing opportunities in various fields. However, despite the increasing popularity of generative language models, many models are still limited by a generative language model's tendency to rely on old information with which it is trained. In many cases, a generative language model is limited with respect to knowing what information to include and what information to discard when generating text. Moreover, many generative language models may fail to account for specialized formats or specialized structural requirements for a generated document.

Some embodiments may overcome the technical issue described above by comparing information derived from a summarization or other type of text input with information obtained from a set of related documents used to generate text with the generative language mode or to train a generative language model. Some embodiments may obtain an initial text summarization or other type of input text, where the initial text summarization may be generated using a text summarization model. For example, some embodiments may obtain a meeting transcript and provide the meeting transcript to a text summarization model in order to produce an initial text summarization. Some embodiments may then generate a database query based on the text summarization or other input text to retrieve a related set of documents. After retrieving the related set of documents, some embodiments may generate multiple sets of embeddings in an embedding space. For example, some embodiments may provide the initial text summarization to a first encoder model to generate a set of summarization embeddings in the embedding space. Some embodiments may then provide text of the related set of documents to the encoder model to generate corpora-derived embeddings.

Some embodiments may determine regions in the embedding space based on the different sets of embeddings. After generating the summarization embeddings and the corpora-derived embeddings, some embodiments may determine one or more regions in the embedding space to use to generate different parts of a structured document. Some embodiments may select a first region in the embedding space to be used for generating text in a first portion of a structured document and then select a different region in the embedding space to be used for generating text in a second portion of the structured document. For example, some embodiments may determine a complement region that is a part of a first region and does not intersect with other regions. Some embodiments may then generate a first portion of a structured document based on embeddings in the complement region. For example, some embodiments may randomly sample points in a complement region to generate candidate embeddings, generate a set of tokens based on the candidate embeddings, and then provide the set of tokens to a generative language model to generate the first portion of the structured document. Some embodiments may then perform a different set of operations when generating a second portion of the structured document. For example, some embodiments may obtain a set of summarization embeddings and corpora-derived embeddings and the candidate embeddings to the same generative language model or a different generative language model to generate the second portion of the structured document. By using different regions, some embodiments may modify the focus and vocabulary used to generate text. Specifically, by using tokens derived from a complement sub-region of a larger region that is unique to the larger region and not shared with other regions, some embodiments may cause a generative language model to generate text that emphasizes the uniqueness of input text with respect to text that was previously available through training documents or other stored documents.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

Figure 1:
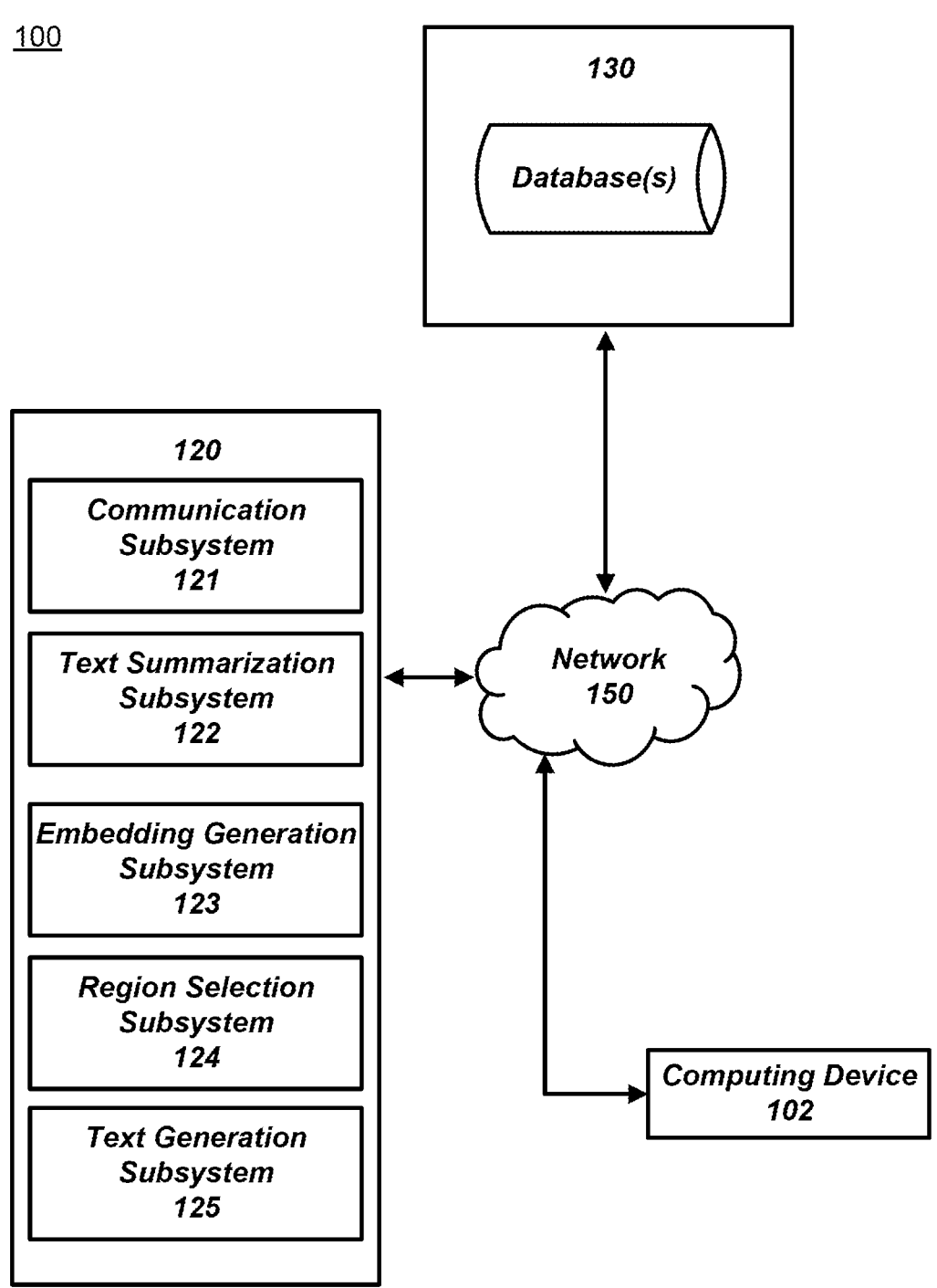
FIG. 1 illustrates an example of a system for generating a structured document using different regions of an embedding space, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1 illustrates an example of a system 100 for generating a structured document using different regions of an embedding space, in accordance with some embodiments. The system 100 includes a computing device 102. The computing device 102 may include computing devices such as a desktop computer, a laptop computer, a wearable headset, a smartwatch, another type of mobile computing device, a transaction device, etc. In some embodiments, the computing device 102 may communicate with various other computing devices via a network 150, where the network 150 may include the internet, a local area network, a peer-to-peer network, etc. The computing device 102 may send and receive messages through the network 150 to communicate with a set of servers 120, where the set of servers 120 may include a set of non-transitory storage media storing program instructions to perform one or more operations of subsystems 121-125.

While one or more operations are described herein as being performed by particular components of the system 100, those operations may be performed by other components of the system 100 in some embodiments. For example, one or more operations described in this disclosure as being performed by the set of servers 120 may instead be performed by the computing device 102. Furthermore, some embodiments may communicate with an application programming interface (API) of a third-party service via the network 150 to perform various operations disclosed herein. For example, some embodiments may generate text via an API by sending input text to the API via the network 150 and receiving, in response to the input text, machine-generated text.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure. For example, the set of databases 130 may store audio recordings, meeting transcripts, other documents, metadata, context values, machine learning model parameters, etc.

In some embodiments, a communication subsystem 121 may send data to or receive data from various types of information sources or data-sending devices, including the computing device 102. For example, the communication subsystem 121 may obtain audio data, meeting transcript data, or other input data from the computing device 102. As described elsewhere in this disclosure, some embodiments may generate a query based on the input data, such as generating a summarization based on a meeting transcript and then generating a query based on the summarization. The communication subsystem 121 may send the query to a data source such as the set of databases 130 or another data source and retrieve a related set of documents based on the query. Furthermore, the communication subsystem 121 may send messages to the set of databases 130 based on operations described in this disclosure. For example, the communication subsystem 121 can retrieve a related set of documents, a set of generative language model parameters, or other data from the set of databases 130.

In some embodiments, a text summarization subsystem 122 may generate a text summarization based on data obtained via the communication subsystem 121. For example, the communication subsystem 121 may obtain a meeting transcript. The text summarization subsystem 122 may then generate an initial text summarization based on the meeting transcript.

In some embodiments, an embedding generation subsystem 123 may generate a set of embeddings based on text summarization or text obtained from an obtained set of documents retrieved via the communication subsystem 121. Some embodiments may use the embedding generation subsystem 123 to generate one or more sets of embeddings associated with different types of input data provided to the embedding generation subsystem 123. For example, some embodiments may generate summarization embeddings based on and associated with an initial text summarization generated by the text summarization subsystem 122. Some embodiments may then generate corpora-derived embeddings based on and associated with text retrieved from the related set of documents. Some embodiments may use one or more various types of models to generate embedding vectors. For example, some embodiments may use a neural network encoder model that includes multiple neural network layers and is trained as a part of an encoder-decoder system. Some embodiments may use pre-trained word embedding models such as Word2Vec, FastText, or Global Vectors for Word Representation ("GloVe"). Some embodiments may use transformer-based embedding models, such as encoder models of a Bidirectional Encoder Representations from Transformers (BERT) model or a generative pre-trained transformer (GPT) model.

In some embodiments, a region selection subsystem 124 may determine one or more regions that will be used to generate text for a structured document. After generating embedding vectors in an embedding space (i.e., a vector space of the embedding vectors), some embodiments may determine multiple regions in the embedding space based on the set of embedding vectors ("embedding set"). For example, some embodiments may determine a first region associated with a summarization by generating a multidimensional hull based on a set of summarization embeddings using an implementation of a convex hull algorithm, such as an implementation of a Jarvis march algorithm, an implementation of a Quickhull algorithm, or an implementation of a Chan's algorithm. Some embodiments may then determine a first region as the region surrounded by the generated hull. Some embodiments may then perform a similar operation to determine a region in vector space based on another embedding set, such as a set of corpora-derived embeddings.

After determining a set of regions based on a corresponding set of vectors, some embodiments may determine one or more regions that are unique to a first region associated with input text. For example, some embodiments may determine a unique region to be a complement region that is part of the first region but not within any intersection between the first region and a second region derived from and associated with a set of documents determined to be related to the input text.

In some embodiments, a text generation subsystem 125 may generate one or more portions of a structured document based on embeddings derived from the complement region or otherwise associated with text that is relatively unique to input text with respect to a set of related documents. Some embodiments may perform one or more operations that include determining data representing unique words, unique phrases, or unique ideas provided by an input that is not provided by or underemphasized by a set of documents indicated to be related to the input text. Some embodiments may use one or more vectors in the complement region determined by the region selection subsystem 124. When obtaining a vector from a region, some embodiments may select one or more pre-generated embedding vectors in that region, where the pre-generated embedding vectors were generated by providing input text (e.g., a transcript, a summarization, etc.) or text from a set of documents to an encoder model. Alternatively, or additionally, obtaining a vector from a region may include sampling a region to obtain one or more new vectors in that region. For example, some embodiments may select one or more pre-generated embedding vectors in the complement region, where the one or more pre-generating embedding vectors were generated by providing the input text to an encoder model. Alternatively, some embodiments may obtain a vector in the complement region by randomly sampling the complement region to generate a new vector within the complement region.

After obtaining the embedding vectors from an embedding space region, some embodiments may provide the embedding vectors to a decoder model to generate a set of tokens. Some embodiments may use templates to organize the tokens into meaningful sequences before providing the tokens to a generative language model. Alternatively, or additionally, the generative language model may include one or more model layers to sort the tokens into meaningful sequences. The generative language model may output text sequences that are then used to generate or update portions of a structured document. In some embodiments, the text generation subsystem 125 may generate different portions of a structured document based on different vectors of different regions. For example, some embodiments may use the text generation subsystem 125 to generate a first portion of a structured document based on vectors obtained in a complement region and generate a second portion based on vectors obtained in an intersection region. By generating different text assigned to different sections, some embodiments may then change the emphasis of different portions of a document without requiring user intervention to modify machine learning model weights when generating text.

As used in this disclosure, a structured document may include any document that is organized into different sections. A document section may include multiple characters, words, phrases, sentences, or paragraphs, where a subsection may be a section that is within another section. In some embodiments, a section of a document may be implicitly defined based on document headings, document spacing, changes in formatting, etc., where such sections may be detected using a rule-based section detection method or a machine learning model. Alternatively, or additionally, a document section may be explicitly indicated in metadata associated with the document. A portion of a structured document may include sections of the document, headings of the document, paragraphs of the document, standards of the document, phrases of the document, lists of the document, some combination of the above, etc. A portion may be within another portion, where a portion that is within another portion may be referred to as a "sub-portion," where it should be understood that a portion that is not referred to as a sub-portion can still be a sub-portion. Non-limiting examples of structured document may include patent applications, patents, contracts, collections of federal or state statutes, or collections of regulations.

Figure 2:
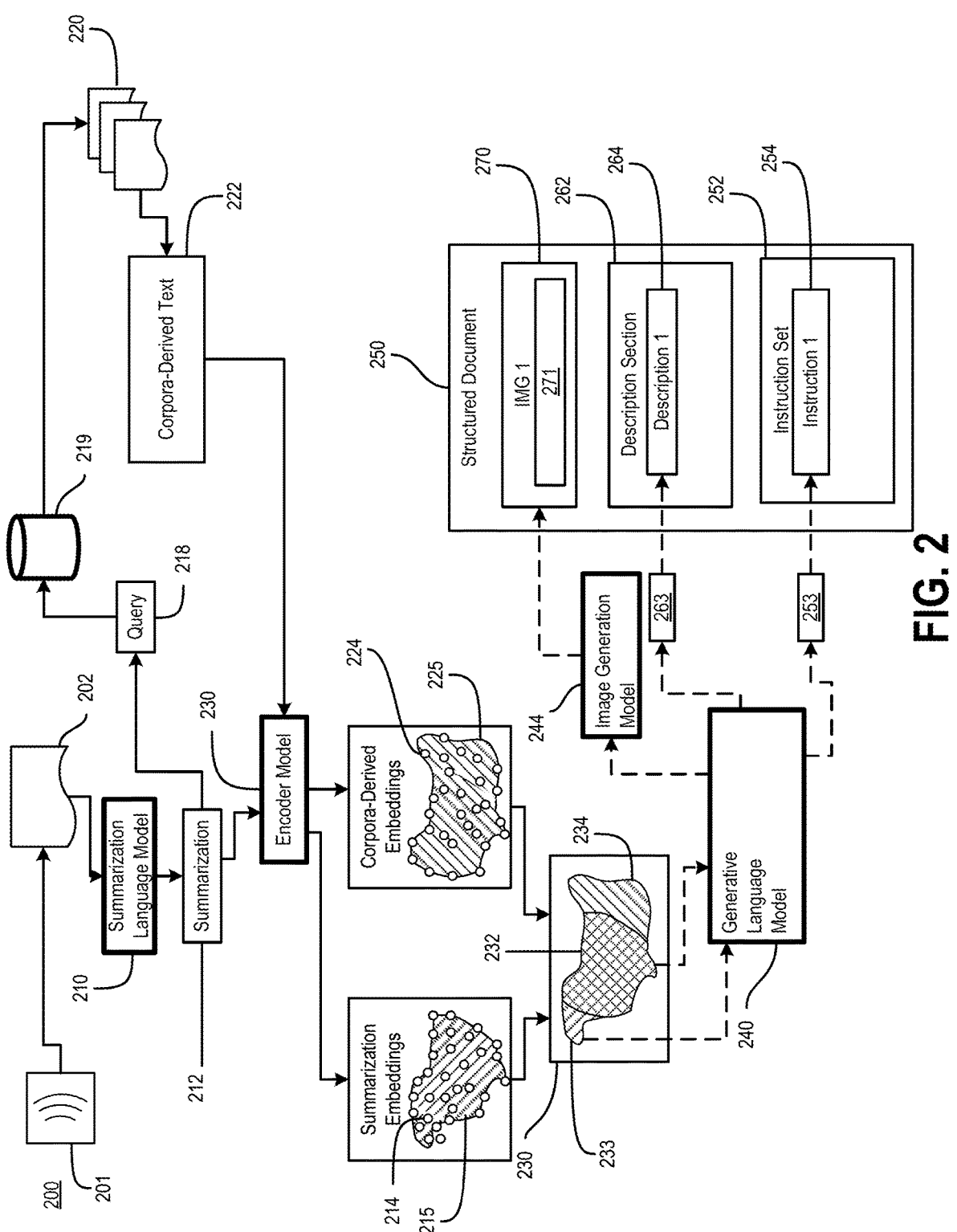
FIG. 2 illustrates a conceptual diagram of a system for generating a structured document, in accordance with some embodiments.

FIG. 2 illustrates a conceptual diagram of a system 200 for generating a structured document, in accordance with some embodiments. In some embodiments, the system 200 receives an audio recording 201 and converts the audio recording into an initial document 202. The system 200 provides the initial document 202 as an input to a summarization language model 210. Alternatively, an initial document may be typed into a form, uploaded by a user, or obtained via an API. For example, the initial document 202 may include an initial set of descriptions indicating a novel invention that is typed into a web application form. The summarization language model 210 outputs a summarization 212 in response to being provided with the initial document 202. For example, if the initial document 202 includes a ten-page specification about a novel invention, the summarization 212 may provide a three-paragraph summary of the novel invention. Some embodiments may then provide the summarization 212 to an encoder model 230. The encoder model 230 may then provide a set of summarization embeddings 214, where the summarization embeddings may be represented as a set of multidimensional vectors within an embedding space.

Some embodiments may use the summarization 212 or other text obtained from the initial document 202 to generate a query 218 that is then sent to a corpora database 219. Alternatively, in some embodiments, the query 218 may be generated based on the initial document 202 without using the summarization 212. For example, if the initial document 202 includes novel invention information, some embodiments may use information derived from the summarization 212 or directly copied from the initial document 202 to generate a query that includes a described feature of the novel invention. In response to receiving the query 218, the corpora database 219 outputs a set of related documents 220, where the set of related documents 220 are related to at least one of the summarization 212 or the initial document 202. For example, the set of related documents 220 may be related to the summarization 212 or the initial document 202 with respect to a shared word, shared phrase, shared concept, shared topic, shared metadata, etc. As another example, the set of related documents 220 may be related to the summarization 212 or the initial document 202 with respect to a shared topic, such as a topic related to a technical domain indicated by a novel invention description that is provided by the summarization 212. When determining a shared concept, some embodiments may use a knowledge graph that relates different words or phrases with each other as being part of a shared concept. For example, in some embodiments, the query 218 may include a first phrase "rotor gyroscope" from the summarization 212. In response to receiving the query 218, some embodiments may refer to a knowledge graph that relates the first phrase to a second phrase "multi-axis stabilization" and retrieve a document for the set of related documents based on a determination that the document includes the second phrase, is labeled with the second phrase in metadata, or is otherwise associated with the second phrase in the corpora database 219. Furthermore, to determine shared topics, some embodiments may use a bag of words or term frequency-inverse document frequency (TF-IDF) analysis of the documents, using a latent Dirichlet allocation (LDA) method to compare the topics of the summarization 212 or the initial document 202 with the topics of the set of related documents 220, use a transformer model to determine topics, etc.

As another example, some embodiments may retrieve a set of documents based on a determination that a requirement for multiple shared topics or shared categories are satisfied. For example, some embodiments may retrieve an initial query derived from a natural language request for a natural language contract between two parties that includes the descriptor "payment for time showing drone-constructed display system." Some embodiments may then generate a drone-related query that includes the descriptor or a summarization derived from the descriptor. Some embodiments may then send the drone-related query to the corpora database 219. In response to receiving the query, the corpora database 219 may output the set of related documents 220 such that each respective document of the set of related documents 220 satisfies a set of criteria that (1) the respective document is categorized as a contract and (2) the respective document includes or otherwise is labeled with the topic "drone."

Some embodiments may determine a set of corpora-derived text 222 based on the set of related documents 220. Some embodiments may include all of the text of the set of related documents 220 into the set of corpora-derived text 222. Alternatively, some embodiments may select portions of the set of related documents 220 for use as part of the set of corpora-derived text 222, where the portions may be selected based on information provided by the query 218. For example, some embodiments may select a portion of a related document for inclusion in the set of corpora-derived text 222 based on a token segment (e.g., a shared word, phrase, related word or phrase indicated by a knowledge graph, topic, etc.). In some embodiments, the portion may also include surrounding text from the related document based on a determination that the surrounding text is part of a same phrase, same sentence, same paragraph, or same document section. For example, some embodiments may split a document into multiple sections based on text spacing, text formatting, enumeration, or other visual attributes of a document and then add a first section of the document into the set of corpora-derived text 222 based on a determination that a token segment (e.g., a token segment determined based on the query 218) is found in the first section. Some embodiments may then provide the set of corpora-derived text 222 to the encoder model 230 to generate a set of corpora-derived embeddings 224, where the set of corpora-derived embeddings 224 are in the same embedding space as the set of summarization embeddings 214. Some embodiments may further augment or modify the set of corpora-derived text 222 by providing some or all of the set of corpora-derived text 222 to a large language model (LLM) to update or replace the set of corpora-derived text 222 with an output of the LLM.

After obtaining multiple sets of vectors, such as the set of summarization embeddings 214 and the set of corpora-derived embeddings 224, some embodiments may determine a set of regions for the multiple sets of vectors. Some embodiments may determine a first region 215 based on the set of summarization embeddings 214 and a second region 225 based on the set of corpora-derived embeddings 224. For example, some embodiments may use an application or function that implements a convex hull algorithm to determine the boundaries of the first region 215 based on the set of summarization embeddings 214 and to determine the boundaries of the second region 225 based on the set of corpora-derived embeddings 224.

After determining regions associated with different types of inputs, where the first region 215 is associated with the initial document 202 or the summarization 212 and where the second region 225 is associated with the set of corpora-derived text 222 or the set of related documents 220, some embodiments may then determine an intersection region 232 by determining an intersection of the first region 215 and the second region 225. By determining the intersection region 232, some embodiments may also determine a first complement region 233 as the region of the first region 215 that is not part of the intersection region 232. Similarly, some embodiments may also determine a second complement region 234 as the region of the second region 225 that is not a part of the intersection region 232. In some embodiments, the summarization 212 or the initial document 202 includes new vocabulary, unused combinations of operations, or other types of novel information that is not found within the set of corpora-derived text 222. In such cases, the intersection region 232 may represent the non-novel portion of information found in the summarization 212 or the initial document 202. Furthermore, the first complement region 233 may represent novel portions of information found the summarization 212 or the initial document 202. Additionally, the second complement region 234 may represent portions of information not found in the first complement region 233. For example, if the initial document 202 represents information about a new invention holding one or more novel features, the first complement region 233 may include representations of tokens or token sequences that indicate the novel inventive aspect described in the initial document 202. In contrast, the first complement region 233 may represent token or token sequences that can provide context to relate the novel inventive aspects described in the initial document 202 or the summarization 212 to existing information derived from the set of corpora-derived text 222.

Some embodiments may then generate different parts of a structured document 250 by providing information derived from the intersection region 232, the first complement region 233, or the second complement region 234 to a generative language model 240. Some embodiments may generate a first portion 252 of the structured document 250 based on factors obtained from the first complement region 233. For example, some embodiments may sample the first complement region 233 to generate a set of vectors and then provide the set of vectors to a decoder model to generate a set of tokens. Some embodiments may then provide the set of tokens to the generative language model 240, where some embodiments may first modify the set of tokens using pre-processing methods or a template-based method to sort the set of tokens into a set of tokens sequences. The generative language model 240 may then output a first text 253 that is then positioned into a sub-portion 254 of the first portion 252. As a first domain-specific example, if the first complement region 233 relates to information about the novel aspects of an invention, some embodiments may provide the first complement region 233 to the generative language model 240 to generate information related to a patent application claim in the first text 253. As a second domain-specific example, if the first complement region 233 relates to information about unique provisions in the summarization 212 not found in the set of corpora-derived text 222, some embodiments may provide the first complement region 233 to the generative language model 240 to generate the first text 253 such that the first text 253 includes information related to the unique provisions for use in a "payment terms" portion of a contract between two or more parties.

After generating the first text 253, the generative language model 240 may be caused to generate a second portion 262 by generating a second output text 263 based on the first complement region 233 and inserting the second output text 263 into a sub-portion 264 of the second portion 262. For example, some embodiments may obtain a set of vectors of the intersection region 232, where vectors in the intersection region 232 may include vectors of the set of summarization embeddings 214 and vectors of the set of corpora-derived embeddings 224. Some embodiments may then generate the second output text 263 by converting the obtained vectors of the intersection region 232 into a set of tokens and then providing, as an input, the set of tokens to the generative language model 240 to generate the second output text 263 for insertion into the sub-portion 264. As an example, if the first complement region 233 includes novel inventive information, some embodiments may generate the second output text 263 based on the first complement region 233 such that the second output text 263 includes an expanded description of the information encoded represented by the first complement region 233. Furthermore, some embodiments may augment the second output text 263 by providing one or more embeddings in the intersection region 232 to the generative language model 240. The generative language model 240 may generate additional outputs to provide additional text to provide context for any novel information related to the first complement region 233 based on the intersection region 232. Such additional text may be useful for providing additional enabling information that is relevant for a patent description in the sub-portion 264 or some other part of the second portion 262.

As another example, if the structured document 250 includes a contract between two or more parties, the first complement region 233 may represent unique stipulations for the contract. The intersection region 232 may include token sequences that encode shared contract-related priorities and clause phrases. In some embodiments, the information represented by the intersection region 232 may be shared between embeddings derived from the set of corpora-derived text 222 and embeddings derived from the initial document 202 or the summarization 212. Some embodiments may then generate a "scope of deliverables" portion of the sub-portion 264 based on (1) the intersection region 232 and (2) previously generated contract text representing a "payment terms' section of the sub-portion 254.

Some embodiments may further link the sub-portion 264 with the sub-portion 254 such that an update to the sub-portion 254 may cause an update to the sub-portion 264 (e.g., providing some or all of the text in the sub-portion 254 to the generative language model 240 to generate a new output text and inserting the new output text into the sub-portion 264). For example, the sub-portion 254 may represent a portion of a patent claim, and some embodiments may link the portion of the patent claim with a portion of a patent specifications section represented by the sub-portion 264. If a user updates the portion of the patent claim, some embodiments may then automatically update the portion of the patent specifications represented by the sub-portion 264. As another example, the sub-portion 254 may represent a portion of a "payment terms" section of a contract, and some embodiments may link the portion of the portion of the "payment terms" section with a portion of a "scope of deliverables" section represented by the sub-portion 264. If a user updates the portion of the "payment terms" section, some embodiments may then automatically update the portion of the "scope of deliverables" section represented by the sub-portion 264.

Some embodiments may further provide some or all of the first text 253 or the second output text 263 to an image generation model 244, where the image generation model 244 may then output an image 270. Some embodiments may further associate the image 270 or an identifier of the image 270 with the sub-portion 264 or the sub-portion 254. For example, some embodiments may associate a section or sub-section of the structured document 250 that includes the sub-portion 264 with the image 270 such that the identifier 271 of the image 270 is included in the sub-portion 264 or the section including the sub-portion 264. For example, if the identifier of the image 270 is "img 1," the sub-portion 264 may include "img 1," or the section of the structured document 250 that includes the sub-portion 264 may include "img 1."

It should be understood that while the system 200 shows the use of a single generative language model in the form of the generative language model 240, other embodiments may use multiple generative language models. Alternatively, or additionally, some embodiments may use a generative language model that may be split into multiple sub-models, such as a first sub-model that uses a transformer-based model and a second sub-model that uses a random forest model. Furthermore, a generative language model used in this disclosure may be split into multiple processing layers, where different processing layers may process the data in different ways (e.g., a first layer that uses the output of the set of neural network layers).

Figure 3:
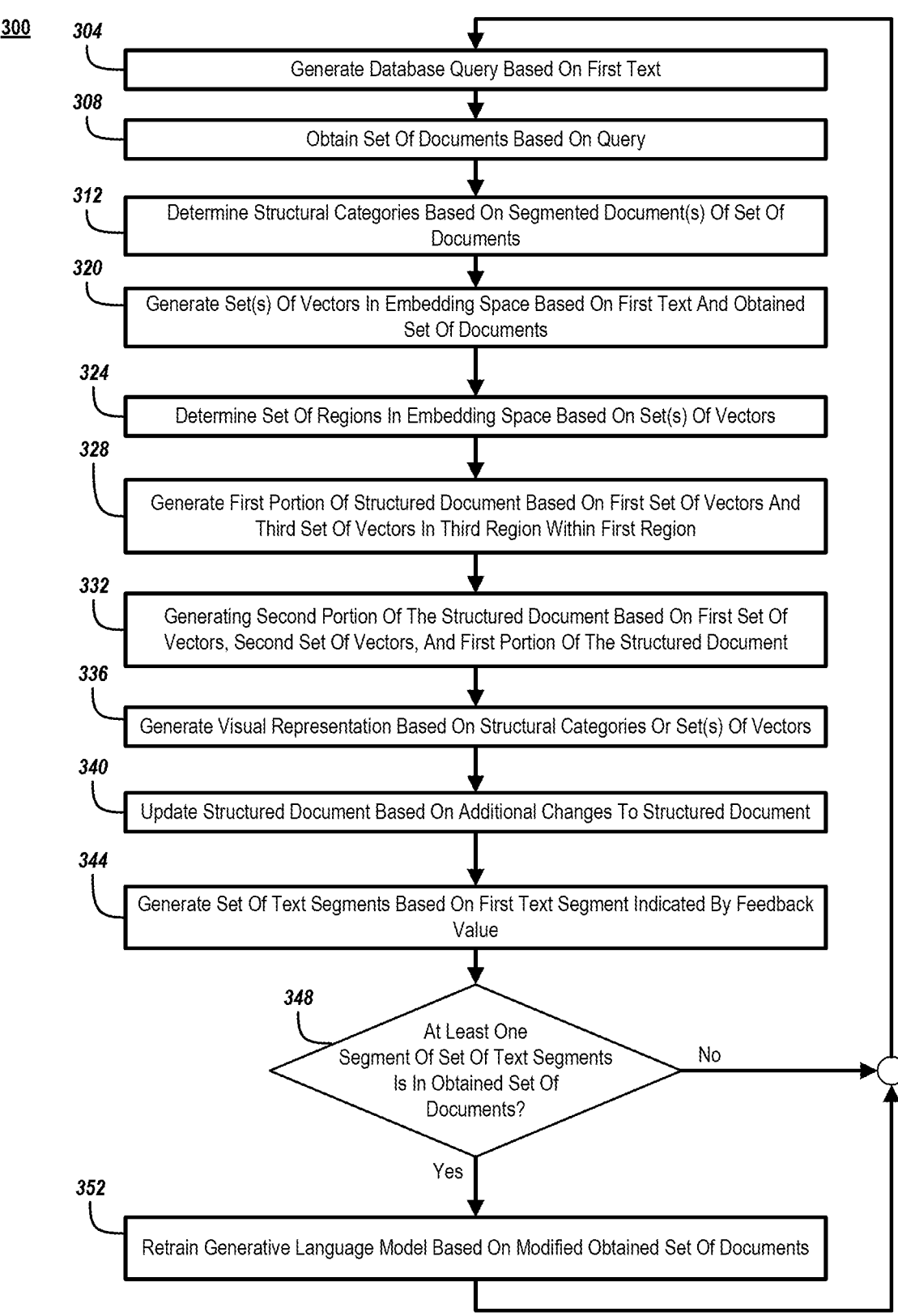
FIG. 3 is a flowchart of a process for generating a structured document, in accordance with one or more embodiments.

FIG. 3 is a flowchart of a process 300 for generating a structured document, in accordance with one or more embodiments. Some embodiments may generate a database query based on a first text, as indicated by block 304. Some embodiments may obtain a related set of documents that is related to an initial text summarization by generating a database query for the related set of documents. Some embodiments may generate the database query based on a first text, where the first text may include a set of keywords, phrases, summarizations, or natural language statements. In some embodiments, the first text may be provided by a user via a graphical user interface (GUI) or other electronic interface. Alternatively, or additionally, the data used to generate a database query may be derived from audio data or a meeting transcript. For example, some embodiments may obtain an audio recording of a 30-minute meeting and generate a text summarization by providing a meeting transcript of the recording to a summarization language model. A summarization model may include an extractive summarization model (e.g., TextRank, LexRank, etc.), an abstractive summarization model (e.g., BERTSUM, Text-To-Text Transfer Transformer, Pre-training with Extracted Gap-sentences for Abstractive Summarization (PEGA-SUS)), or a hybrid model that includes abstract and extractive sub-models (e.g., pointer-generator networks). Some embodiments may utilize a workflow in which an application or set of applications may perform operations to detect the conclusion of a meeting, generate a meeting transcript based on the meeting, generate a summarization based on the transcript, and generate a database query in response to detecting the summarization. Some embodiments may then perform other operations described in this disclosure based on the generated query, such as retrieving document data or other texts data based on the query, as indicated elsewhere in this disclosure.

When using a document (e.g., a meeting transcript generated based on an audio recording) to generate text segments with a generative language model, the document may include various text sections having different levels of importance. Some embodiments may indicate different document sections (e.g., transcript portions representing a sequence of words spoken by one or more meeting participants) of the document and associate different indicators to the document sections. Some embodiments may then assign different weight values to the different document sections to indicate an importance of that section. For example, some embodiments may obtain a meeting transcript that includes multiple transcript portions, where each transcript portion includes words spoken by a meeting participant, entered into a user interface by a meeting participant, or otherwise provided by a meeting participant. Some embodiments may then analyze the different transcript portions to determine that one or more of the transcript portions should be assigned with a greater weight value than other transcript portions of the transcript. Some embodiments may assign greater weight values to a transcript portion in response to a determination that the transcript portion includes one or more words or phrases that are part of a dictionary, indicating importance. Alternatively, or additionally, some embodiments may prioritize a transcript portion based on an indication that a target participant as identified by a participant identifier is prioritized (e.g., by associating a priority indicator with the participant identifier in a record). For example, some embodiments may assign a greater weight value to a transcript portion when a particular meeting participant is indicated to have spoken that transcript portion in an audio recording or otherwise provided that transcript portion.

After obtaining a set of weight values associated with transcript portions (or other types of text sections of a document), some embodiments may use the set of weight values when generating text using a generative language model. For example, some embodiments may use the set of weight values as additional inputs for the generative language model. Alternatively, or additionally, some embodiments may configure one or more model parameters of the generative language model.

Some embodiments may remove, obfuscate, or otherwise redact a transcript portion based on a user or machine-generated selection before generating text based on a meeting transcript or other document. For example, some embodiments may obtain an indicator for a transcript portion of a meeting transcript, where the indicator indicates that the transcript portion should be redacted. Some embodiments may then generate a redacted meeting transcript, where the redacted meeting transcript is a modified version of the meeting transcript such that the indicated transcript portion is not part of the modified version. Some embodiments may then provide some or all of the modified version of the meeting transcript as an input for a text summarization model to generate output text that may then be used to determine a set of vectors in an embedding space.

When generating a database query, some embodiments may adapt the database query for a specific query language or for a known data model. For example, some embodiments may obtain a natural language summarization that comprises the keywords "blue," "data model," and "recurrent." Some embodiments may then generate a SQL query that indicates instructions understandable to an SQL database system that causes the SQL database system to search for documents comprising the keywords "blue," "data model," and "recurrent." Furthermore, some embodiments may adapt the query for a knowledge graph that relates documents to a search term in the query, even if the related documents do not specifically include the search term.

Some embodiments may obtain a set of documents based on the database query, as indicated by block 308. In some embodiments, the set of documents retrieved from a database of documents may be related based on a shared topic, the presence of a shared keyword, or based on a relationship to data provided via a database query as indicated in a knowledge graph. For example, some embodiments may have generated a database query based on an initial phrase "machine learning" and determine, based on a knowledge graph, that the initial phrase "machine learning" is related to the phrase "neural network." Some embodiments may then retrieve at least one document based on the phrase "neural network."

Some embodiments may obtain documents from different domains, where the different documents may be treated differently based on their source domain. Some embodiments may rank a set of domain categories by their similarity scores with respect to first text provided to an encoder model, where the first text may be extracted from or derived from a first document (e.g., a meeting transcript). For example, some embodiments may provide text associated with a first domain category (e.g., documents associated with the domain category "patents") and the first text or another portion of the first document to a similarity determination function. The similarity determination function may use operations based on cosine similarity, Jaccard similarity, edit distances, embedding similarity, structural similarity, or other similarity methods to determine a similarity between the text associated with the first domain category and the first text or other portion of the first document. Some embodiments may then perform similar operations to determine the similarity scores with a set of other domain categories (e.g., domain categories having the label "science article," "technical manual," "advertisement," etc.) and rank the set of domain categories based on the corresponding similarity scores. Some embodiments may then select one or more documents when generating one or more vectors of one or more sets of vectors based on the set of domain categories. For example, some embodiments may be configured to select a first document from a first set of documents based on a determination that the first set of documents is associated with a highest-ranked domain category. Additionally, or alternatively, some embodiments may be configured to select a second document from a second set of documents based on a determination that the second set of documents is associated with a second-highest-ranked domain category. By selecting documents based on their similarity to an input text or a document from which the input text is extracted or generated, some embodiments have a greater chance of selecting documents that are relevant to the target document. As described elsewhere, some embodiments may then use at least one of the selected documents when generating one or more vectors.

Some embodiments may take advantage of known duplications indicated by a domain-specific set of documents and remove substantively duplicative material between documents from further consideration while keeping differentiating material between the documents. Some embodiments may obtain a first document and a second document from a database. Some embodiments may then retrieve metadata or other data serving as a candidate identifier for the first document and determine that the candidate identifier matches with an identifier of the second document. For example, some embodiments may retrieve a first document from a database that indicates that the first document is associated with the identifier "doc01." Some embodiments may then retrieve a second document from the database that indicates that the second document is associated with the identifier "doc02" and further that the second document has metadata that indicates the identifier "doc01." Some embodiments may then determine that the identifier of the first document matches with the metadata identifier of the second document. In response to a detected match, some embodiments may confiscate, delete, or otherwise remove from consideration one or more text sequences that match between the two documents while keeping one or more candidate text differences between the first and second documents. For example, if a target section of the first document recites the text sequences "blue red yellow" and the target section of the second document recites the text sequence "green blue green," where the other sections of the first and second documents are duplicative, some embodiments may generate a modified version of the second document to include the text sequence "green blue green" and not include the duplicative text sections. When performing other operations, such as operations described for block 312 or block 320, some embodiments may use the modified version of the second document in view of the entirety of the second document.

Some embodiments may determine a set of structural categories based on the set of documents, as indicated by block 312. Some embodiments may determine a sequence of structural categories associated with the structure of a training document associated with different structural categories (e.g., system figure, conceptual figure, diagram). Some embodiments may segment a document into a set of sections and determine the sequence of structural categories for the set of sections based on text spacing in the document, text size differences between different words or phrases of the document, text positions of text in the document, bullet points or enumerated lists in the document, other formatting changes in the document, etc. For example, some embodiments may detect a first set of centered text "DETAILED DESCRIPTION" and a second set of centered text "CLAIMS" that follows the first set of centered text, where additional text is positioned between the first and second sets of centered text. Some embodiments may assign one or more text sections between the first and second sets of centered text with the structural category "DETAILED DESCRIP-TION" and assign text below the second set of centered text with the structural category "CLAIMS," where the order of the structural categories may be preserved as a sequence of categories associated with one or more documents of the set of documents. Furthermore, a structural category may be within the domain of another structural category. For example, some embodiments may assign a first structural category "image 1 description," a second structural category "image 2 description," and a third structural category "image 3 description" to text sections in a document, where the text sections are all within a larger text section assigned to the fourth structural category "collected image descriptions."

Furthermore, some embodiments may use a classification machine learning model to assign structural categories to a set of sections after training the classification machine learning model (e.g., a random forest model, a recurrent neural network model, etc.) based on a training corpus of labeled documents. For example, some embodiments may segment a set of patent application documents into a set of segmented documents. Some embodiments may then pro-vide the set of segmented documents to a trained recurrent neural network model that has been configured to classify different sections of a document with labels indicating different sections of a patent document, where the labels may be arranged as a respective sequence of structural categories for each respective segmented document. As described elsewhere in this disclosure, some embodiments may then use the sequence of structural categories to deter-mine a structure of a structured document that is to be generated using one or more operations described in this disclosure.

Some embodiments may generate a first set of vectors and a second set of vectors based on the first text and the obtained set of documents, as indicated by block 320. Some embodiments may generate multiple sets of vectors in embedding space, where each set corresponds with a dif-ferent set of documents or other text data. For example, some embodiments may generate a first set of vectors in an embedding space based on or associated with the first text. As described elsewhere, the first text may include input text provided by a user, derived from input text provided by a user (e.g., a summarization), or otherwise be generated from user-provided input data (e.g., an audio recording provided by a user). Furthermore, some embodiments may generate a second set of vectors based on or associated with text of the obtained set of documents, where the obtained set of docu-ments may include a set of related documents that are related to the input text or other input data provided by the user.

Some embodiments may generate a set of vectors repre-senting embeddings in embedding space based on text by providing the text to an encoder model, where the encoder model outputs embedding vectors in the embedding space based on input text. As described elsewhere in this disclo-sure, the encoder model may be trained with a set of training data and may be implemented as a neural network, such as a sequence-to-sequence model, an autoencoder encoder net-work, or a transformer encoder network. For example, some embodiments may train an autoencoder in conjunction with a decoder neural network using a set of training data that includes a set of input training text and a set of output training objectives. It should be understood that various types of autoencoder networks are possible to perform encoder operations described in this disclosure, such as a variational autoencoder that maps input text to a set of distributions and then samples the set of distributions to generate the vectors in the embedding space. After training or other configuration operations, an encoder provided with input text may generate a set of vectors in a lower-dimension embedding space.

As described elsewhere in this disclosure, some embodi-ments may generate an initial text summarization based on a transcript indicating the content of a meeting or another document. Some embodiments may provide the initial text summary to a first encoder model, where the first encoder model may convert the initial text summary into a set of summarization embeddings. Furthermore, some embodi-ments may have previously obtained a set of documents based on a database query that includes the initial text summary or is otherwise generated based on the initial text summary. Some embodiments may provide text from a related set of documents obtained from the database query to the encoder model to generate a second set of vectors in the same embedding space as the first set of vectors. For example, after generating a first set of vectors based on a first statement that includes a first phrase "recurrent generative model," some embodiments may use a database query that includes the first phrase to retrieve a set of documents that includes the first phrase or is otherwise indicated as being related to the first phrase. Some embodiments may then generate a second set of vectors based on the text in the retrieved set of documents, such as by directly providing the text to the encoder model or by generating a set of summa-ries using a text summarization model based on the text in the retrieved set of documents and then providing the set of summaries to the encoder model.

Some embodiments may limit the portion of text used when generating vectors based on a set of obtained docu-ments. For example, some embodiments may determine a first set of vectors based on or associated with a user-provided input. Some embodiments may then determine a second set of vectors based on or associated with a set of obtained documents. When determining the second set of vectors, some embodiments may determine a corpora docu-ment portion of a document in the set of obtained documents and then use the corpora document portion to determine one or more vectors of the second set of vectors. Furthermore, some embodiments may determine a corpora document portion based on the first set of vectors associated with the user-provided input. For example, some embodiments may generate a superset of vectors based on text in the set of obtained documents. Some embodiments may then deter-mine a candidate set of vectors based on the first set of vectors by selecting a candidate set of vectors within the superset of vectors, where each vector of the candidate set of vectors is within a preset embedding space distance of the first set of vectors, within a preset embedding space distance of a centroid of the first set of vectors, or within an embedding space surface generated from the first set of vectors (e.g., a convex hull). Some embodiments may then determine a candidate region based on the candidate set of vectors and use the candidate region to select the second set of vectors.

Some embodiments may use assigned category values as a representation of a repetitive document and reduce weight associated with a possibly repetitive document when determining vectors used in this disclosure. For example, some embodiments may obtain an initial set of text based on a set of obtained documents, where the set of obtained documents includes a first document and a second document. Some embodiments may determine that a first text portion of the initial set of text is duplicative with respect to a second text portion of the initial set of text. Some embodiments may then reduce a weight associated with the text of the first document or the second document, where such weights are assigned to different documents to indicate the degree of importance for vectors generated from the different documents. For example, when generating a second set of vectors based on and associated with a set of obtained documents, some embodiments may provide weight values associated with the set of obtained documents as additional inputs.

Some embodiments may determine a first region in the embedding space based on the first set of vectors and a second region in the embedding space based on the second set of vectors, as indicated by block 324. In some embodiments, a region in an embedding space may represent a lower-dimension representation of concepts, vocabulary, or related data. Some embodiments may determine a region in an embedding space when provided with a set of vectors in the embedding space by using a convex hull algorithm or an alpha shapes algorithm to determine a region that contains all of the vectors in the embedding space. Alternatively, or additionally, some embodiments may determine a region using a clustering algorithm, such as a density-based algorithm, to determine, as a region, a cluster in the embedding space and assign the additional positions within the cluster to the region. Furthermore, some embodiments may combine the results of different types of region-defining algorithms when determining a region.

Some embodiments may generate different regions, such as generating a first region based on a first set of vectors and generating a second region based on a second set of vectors, where the differences in the first and second set of vectors may be based on the input data to generate the sets of vectors. For example, some embodiments may generate a first set of vectors in an embedding space based on initial text summary and generate a second set of vectors in the embedding space based on other documents indicated as being associated with at least one word or phrase of the initial text summary. Some embodiments may determine a first region in the embedding space by using an implementation of a convex hull algorithm on the first set of vectors. Some embodiments may then determine a second region in the embedding space by using the implementation of the convex hull algorithm on the second set of vectors.

Some embodiments may generate a first portion of the structured document based on a first set of vectors and a third set of vectors in a third region of the embedding space that is within the first region and not within the second region, as indicated by block 328. Some embodiments may determine a complement region in the embedding space that is within the first region and not within the second region. Some embodiments may determine the complement region as the portion of the first region that does not intersect with the second region. For example, some embodiments may determine an intersecting region between a first and second region and determine, as a complement region, the portion of the first region that is not part of the intersecting region. This complement region may represent a unique aspect of data used to generate the first region that is not provided by data used to generate the second region. Some embodiments may then use this complement region in the embedding space to generate one or more portions of a structured document. For example, some embodiments may determine one or more phrases based on the complement region by selecting a set of vectors in the complement region, using a decoder model to generate a corresponding set of phrases, and providing the corresponding set of phrases to a generative language model to generate a set of text portions to be used in one or more structured documents.

As described elsewhere in this disclosure, the generative language model may include various types of neural network models. For example, the generative language model may include a recurrent neural network, a long short-term memory (LSTM) network model, a gated recurrent unit (GRU) model, a transformer model or another type of attention-based neural network model, etc. Some embodiments may use a generative language model that includes multiple types of neural network models, such as by using an ensemble model, where the different sub-models in the ensemble model may have the same architecture or may have different architecture with respect to each other.

Some embodiments may account for the importance of specific vocabulary or equivalent vocabulary associated with text generated from the complement region of an embedding space when using a generative language model. For example, some embodiments may use a first sub-model of the generative language model to determine one or more tokens based on vectors in a complement region. In some embodiments, the vectors used to determine the one or more tokens may have been pre-provided in a transcript, a user-provided input, or a summarization of the transcript or user-provided input. Alternatively, some embodiments may sample the complement region to determine the vectors used to determine the one or more tokens. By using pre-provided tokens or newly generated tokens based on the complement region to generate text in a structured document, some embodiments may increase the weight that more unique data has when generating the text.

When generating a structured document, some embodiments may determine a hierarchy of different portions by providing different output text for different elements of an enumerated sequence, where the enumeration may indicate dependencies between the different elements. For example, some embodiments may generate a first text segment of the enumerated sequence of text segments and include this first text segment in a first element of an enumerated sequence. Some embodiments may then generate a second text segment based on the first text segment, such as by providing the first text segment to a generative language model, where the generative language model may be configured to include the first text segment in the generated second text segment. For example, some embodiments may provide a first text segment "self-repeating spline" as an input to a generative language model that then outputs a second text segment "wherein the self-repeating spline comprises a sequence of geometrically increasing splines" based on the input. In some embodiments, the generative language model used to generate the second text segment may be the same generative language model used to generate the first text segment. Alternatively, the generative language model may be different from the generative language model used to generate the first text segment.

When generating text segments that are sorted in a hierarchical arrangement, this hierarchy may be tracked for later use. For example, some embodiments may generate a first text segment with a first position in a hierarchy and a second text segment with a second position in the hierarchy that indicates that the second text segment is subordinate to the first text segment. As described elsewhere in this disclosure, some embodiments may generate text segments for other sections of a structured document. When generating these other text segments, some embodiments may use this tracked hierarchy to indicate how these other text segments should be sorted with respect to each other.

Some embodiments may train multiple generative language models for different sections of a document. For example, some embodiments may train a first generative language model to be used as a first generative language model based on a first set of text portions. When training the first generative language model, some embodiments may determine the first set of text portions based on a first set of training documents, where the first set of training documents may include documents that are categorized with one or more structural categories. For example, some embodiments may determine a first set of text portions by extracting, from the first set of training documents, all the text portions associated with the category "FIGURE DESCRIPTORS." Some embodiments may then train the first generative language model based on the first set of text portions. Additionally, some embodiments may train a second generative language model to be used as a second generative language model based on a second set of text portions. When training the second generative language model, some embodiments may determine the second set of text portions based on a second set of training documents, where the second set of training documents may include documents that are categorized with one or more structural categories. For example, some embodiments may determine a second set of text portions by extracting, from the second set of training documents, all the text portions associated with the category "SUMMARIES." Some embodiments may then train the second generative language model based on the second set of text portions. When generating a first portion of a structured document, where the first portion is associated with the category "FIGURE DESCRIPTORS," some embodiments may use the first generative language model. Additionally, or alternatively, when generating a second portion of the structured document, where the second portion is associated with the category "SUMMARIES," some embodiments may use the second generative language model to generate output text for one or more portions of a structured document.

Some embodiments may determine a candidate domain based on input text and then select a language model based on the candidate domain. Some embodiments may train multiple generative language models associated with different domains, where a respective language model associated with a respective domain is trained with documents indicated as being related to the respective domain. Some embodiments may then use a classification machine learning model to determine a candidate domain by providing input text (e.g., a summary generated from a document, text from a meeting transcript, etc.) to the classification machine learning model. Some embodiments may then detect a match between the candidate domain and a first domain of a first generative language model and select the first generative language model to generate output text for one or more portions of a structured document.

Some embodiments may generate a second portion of the structured document based on the first set of vectors, the second set of vectors, and the first portion of the structured document, as indicated by block 332. As described elsewhere in this disclosure, when generating text based on a region of an embedding space, some embodiments may use previously obtained tokens or tokens derived from previously obtained text. Alternatively, or additionally, some embodiments may sample a region to determine a set of vectors to then provide as an input to a text generation system. For example, as described elsewhere in this disclosure, some embodiments may determine a first region in embedding space based on a first set of vectors associated with a query and a second region in the embedding space based on text in a set of documents retrieved from a corpora based on the query. Some embodiments may then sample the second region to determine a set of second portion generation vectors that will be used to generate a second portion of a structured document. Alternatively, or additionally, some embodiments may determine one or more vectors of the set of second portion generation vectors by selecting one or more tokens that were previously provided by the retrieved set of documents or in initial input used to generate the first set of vectors.

After determining the set of second portion generation vectors, some embodiments may then use the second portion generation vectors to generate text based on a generative language model. Some embodiments may directly provide the set of second portion generation vectors to a generative language model to generate the text. For example, some embodiments may select one or more vectors of a second set of tokens used to generate the second region and determine a corresponding set of tokens that map to the one or more vectors. Some embodiments may then provide a sequence of tokens that includes the corresponding set of tokens to a generative language model to generate a set of phrases, sentences, or paragraphs for use in a second portion of a structured document. Alternatively, some embodiments may determine a set of tokens that map to the set of second portion generation vectors and provide the set of tokens to a generative language model. For example, some embodiments may randomly sample the second region to obtain a set of second portion generation vectors and determine a set of tokens that map to the set of second portion generation vectors.

Some embodiments may re-order a set of vectors to generate an ordered sequence of vectors or a corresponding ordered sequence of tokens to be used as an input for a generative language model. Alternatively, or additionally, some embodiments may augment vectors or corresponding tokens that are to be used as inputs for a generative language model. For example, some embodiments may obtain an initial set of vectors that maps to the set of tokens "pipeline process," "database indexing," and "reversal."

The generative language model used to generate the second portion may be the same as the generative language model used to generate the first portion. Some embodiments may then generate a sequence of tokens based on this initial set of tokens that recite "provide a description about a pipeline process that includes database indexing and reversal" to a generative language model to generate a second portion of a structured document, where the generative language model was previously used to generate the first portion of the structured document as described for block 328. Alternatively, the generative language model used to generate a second portion may be different from the generative language model used to generate the first portion. For example, the generative language model used to generate a first portion of a structured document, as described for block 328, may be different from the generative language model used to generate a second portion of the structured document, as described for block 332.

Some embodiments may generate additional contextual information based on the set of second portion vectors or an indication that the output text is to be part of a second portion of the structured document. For example, some embodiments may associate contextual information "type: Specification" with the set of second portion vectors or tokens mapped to the set of second portion vectors to indicate the category for text being generated for the second portion of a structured document, where the second portion of the structured document is labeled with the category "Specification."

Some embodiments may generate a set of visual representations based on the set of vectors, as indicated by block 336. Some embodiments may generate figures or other types of visual representations based on a previously determined structure that is indicated by a sequence of structural categories. Some embodiments may generate a visual representation that is linked to a structural category of the structured document. Furthermore, when generating a visual representation, some embodiments may use a same input text that was used to generate a portion of the structured document and then assign one or more identifiers associated with the visual representation with the portion of the structured document. For example, some embodiments may provide a first input text "detach adapter from manifold" to an image generation model, where the image generation model includes the image identifier "FIG. 1." Some embodiments may then provide the first input text to a generative language model that outputs a first generated phrase "detaching the adapter, which may be a male or female adapter, from the manifold" and is configured to output the phrase "FIG. 1" in association with the first generated phrase or select a section of a structured document labeled with a document section identifier "FIG. 1." Furthermore, some embodiments may then provide a second input text "update adapter design for manifold" to the image generation model to generate a second image. Some embodiments may then provide the second input text to the generative language model to output a second generated phrase "update an adapter design for an adapter to be fitted into a manifold shape or other connection shape."

Some embodiments may update the structured document based on one or more detected changes to the structured document, as indicated by block 340. Some embodiments may map a sub-portion of the first portion to a sub-portion of the second portion, detect a change to the first sub-portion of the document, and re-generate the second portion. For example, a first sub-portion may be labeled with the label "claim3" and may be part of a corresponding portion that is labeled with the label "claim set." Additionally, a second sub-portion may be labeled with the label "forClaim3" and may be part of a corresponding portion that is labeled with the label "specification." Some embodiments may map the first sub-portion to the second sub-portion when generating the first and second sub-portions based on a same set of inputs provided to a generative language model. Some embodiments may then detect that a user has updated the first sub-portion, such as by modifying a word or phrase of the first sub-portion. In response to detecting the update to the first sub-portion, some embodiments may update the second sub-portion based on the updated first sub-portion. For example, some embodiments may detect that a user has modified a first portion of a structured document that originally recited "comprising abbreviated norms" to instead recite "comprising full norms." In response, some embodiments may update a second portion of the structured document by determining that the second portion is mapped to the first portion and then updating the second portion with new text, with some embodiments generating the new text by providing the phrase "comprising full norms" to a generative language model. In some embodiments, the phrase may be provided to the generative language model in conjunction with the first set of vectors, the second set of vectors, metadata indicating a section of the structured document, etc.

Some embodiments may generate a set of text segments based on a first text segment indicated by a feedback value, as indicated by block 344. Some embodiments may obtain a feedback value indicating that a first text segment of the structured document is incorrect, where the feedback value may be obtained via user feedback, automated agent, etc. For example, some embodiments may receive user feedback indicating that a phrase "a substructure must be part of the motor" is incorrect. If this phrase is generated with a first generative language model, a possible source of error is the corpora used to train the first generative language model. Some embodiments may be configured to address this possible source of error by executing instructions to search for phrases indicated as erroneous by the user. Some embodiments may further generate variations of this phrase by providing the first generative language model (or a different generative language model) with the erroneous phrase as input with additional input text or other inputs that cause the generative language model to generate variations of the erroneous phrase (e.g., providing a generative language model with the phrase "a substructure must be part of the motor" to generate the output text "the substructure must be in the service motor"). Some embodiments may further receive a set of feedback value provided by a user or automated agent that includes a corrected version of a text segment and replace the original version of the text segment with the corrected version.

Some embodiments may determine whether at least one segment of the set of text segments is in the obtained set of documents, as indicated by block 348. Some embodiments may search an obtained set of documents to determine whether at least one document includes the erroneous phrase or variations of the erroneous phrase. Some embodiments may then associate an indicator with each document that includes the erroneous phrase or variations of the erroneous phrase for modification or removal. In response to a determination that at least one segment of the set of text segments is in the obtained set of documents, some embodiments may proceed to operations described for block 352. Otherwise, operations of the process 300 may return to operations described for block 304.

Some embodiments may retrain the generative language model based on a modified obtained set of documents, as indicated by block 352. Some embodiments may retrain the first generative language model based on a modified obtained set of documents that do not include the documents having the erroneous phrase. Alternatively, some embodiments may then search the obtained set of documents, modify any document that includes the erroneous phrase or variations of the erroneous phrase such that the document no longer includes the erroneous phrase or variations of the erroneous phrase and retrain the first generative language model based on the modified obtained set of documents having modified documents.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIGS. 1-2 could be used to perform one or more of the operations described in relation to FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 or FIG. 2 may include one or more computing devices that are programmed to perform the functions described herein. The computing devices may include one or more electronic storages (e.g., a set of databases accessible to one or more applications depicted in the system 100), one or more physical processors programmed with one or more computer program instructions, and/or other components. For example, the set of databases may include a relational database such as a PostgreSQL™ database or MySQL database. Alternatively, or additionally, the set of databases or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., a network used by the system 100) or other computing platforms via wired or wireless techniques. The network may include the internet, a mobile phone network, a mobile voice or data network (e.g., a 5G or Long-Term Evolution (LTE) network), a cable network, a public switched telephone network, or other types of communications networks or combination of communications networks. A network described by devices or systems described in this disclosure may include one or more communications paths, such as Ethernet, a satellite path, a fiber-optic path, a cable path, a path that supports internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems described in this disclosure or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems described in this disclosure may provide more or less functionality than is described. For example, one or more of subsystems described in this disclosure may be eliminated, and some or all of its functionality may be provided by other ones of subsystems described in this disclosure. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing item. Thus, updating a record may include generating a record or modifying the value of an already-generated value in a record.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: obtaining a set of documents by generating a database query based on a first text; generating a first set of vectors in an embedding space based on the first text and a second set of vectors in the embedding space based on text of the set of documents; determining a first region in the embedding space based on the first set of vectors and a second region in the embedding space based on the second set of vectors; generating a first portion of a structured document based on the first set of vectors and a third set of vectors in a third region that is within the first region and not within the second region; and generating a second portion of the structured document based on the first set of vectors, the second set of vectors, and the first portion of the structured document.

2. A method comprising: obtaining a related set of documents related an initial text summarization of a meeting transcript by generating a database query for the related set of documents based on the initial text summarization; generating (i) summarization embeddings based on the initial text summarization by providing, as input, the initial text summarization to a first encoder model and (ii) corpora-derived embeddings based on the related set of documents by providing, as input, text of the related set of documents to a second encoder model; determining a first region in an embedding space based on the summarization embeddings and a second region in the embedding space based on the corpora-derived embeddings; determining, in the embedding space, a complement region that is within the first region and not within the second region; generating a first portion of a structured document by providing, as input, the summarization embeddings and a candidate set of embeddings in the complement region to a generative language model; and generating a second portion of the structured document by providing, as input, the summarization embeddings, the corpora-derived embeddings, and embeddings derived from the first portion of the structured document to the generative language model.

3. A method comprising: obtaining a set of documents by generating a database query based on a first text; generating a first set of vectors in an embedding space based on the first text by providing the first text to an encoder model and a second set of vectors based on text of a set of documents by providing the text of the set of documents to the encoder model; determining a first region in the embedding space based on the first set of vectors and a second region in the embedding space based on the second set of vectors; generating a first portion of a structured document based on the first set of vectors and a third set of vectors in a third region of the embedding space, wherein the third region is within the first region and not within the second region; and generating a second portion of the structured document based on the first set of vectors, the second set of vectors, and the first portion of the structured document.

4. The embodiment of any of embodiments 1 to 3, wherein generating the first portion of the structured document comprises generating an enumerated sequence of text segments by: generating a first text segment of the enumerated sequence of text segments based on the first portion of the structured document; and generating a second text segment of the enumerated sequence of text segments based on the first text segment.

5. The embodiment of any of embodiments 1 to 4, further comprising: obtaining an audio recording of a meeting; generating a meeting transcript based on the audio recording; obtaining an indicator of a first transcript portion of the meeting transcript; and generating the first text based on the meeting transcript by updating a weight value associated with the first transcript portion of the meeting transcript.

6. The method of embodiment 5, further comprising obtaining a priority indicator of a participant identified by a participant identifier, wherein: generating the meeting transcript comprises generating the first transcript portion based on an associated portion of the audio recording; and obtaining the indicator of the first transcript portion comprises generating the indicator based on data indicating that the participant is speaking while the associated portion of the audio recording is being recorded.

7. The method of any of embodiments 5 to 6, wherein the indicator is a first indicator of a first type, further comprising: obtaining a second indicator of a second transcript portion of the meeting transcript, wherein the second indicator is of a second type different from the first type; generating a redacted meeting transcript, wherein the redacted meeting transcript does not comprise the second transcript portion; wherein generating the first text based on the meeting transcript comprises generating the first text based on the redacted meeting transcript.

8. The embodiment of any of embodiments 1 to 6, further comprising: segmenting a first document of the set of documents into a set of sections; and generating a sequence of structural categories by providing each respective section of the set of sections to a classification machine learning model to determine a respective structural category of the sequence of structural categories, wherein generating the second portion of the structured document comprises determining a structure of the structured document based on the sequence of structural categories.

9. The method of embodiment 8, further comprising: generating a first visual representation based on a first structural category associated with a first element of the sequence of structural categories; and generating a second figure based on a second structural category associated with a second element of the sequence of structural categories.

10. The embodiment of any of embodiments 1 to 9, wherein: obtaining the set of documents comprises: ranking a set of domain categories based on the first text to determine a ranking indicating similarity, wherein the set of domain categories comprises a first domain category and a second domain category; selecting a first document based on the first domain category; determining a first subset of the second set of vectors based on the first document; selecting a second document based on the second domain category; and determining a candidate region in the embedding space of the second document based on the first set of vectors; and determining a second subset of the second set of vectors based on the candidate region.

11. The embodiment of any of embodiments 1 to 10, wherein providing the text of the set of documents to the encoder model comprises determining the text based on the set of documents, and wherein the set of documents comprises a first document and a second document, further comprising: determining a result indicating that a candidate identifier matches with an identifier of the second document, wherein the candidate identifier is indicated in metadata of the first document; and determining a candidate text difference between the first document and the second document, wherein determining the text of the set of documents comprises determining the text of the set of documents based on the candidate text difference.

12. The method of any of embodiments 1 to 11, wherein generating the second set of vectors comprises: obtaining initial text based on the set of documents comprising a first document and a second document, wherein a first text portion of the initial text is obtained based on the first document, and wherein a second text portion of the initial text is obtained based on the second document, and wherein the first document and the second document are not identical; determining that the first text portion is a duplicate of the second document; and reducing a first weight associated with text obtained from the first document, wherein generating the first set of vectors comprises providing the first weight to an encoder model, wherein generating the second set of vectors comprises generating the second set of vectors using the encoder model.

13. The method of any of embodiments 1 to 12, further comprising: obtaining an update to the first portion of the structured document; and updating the second portion of the structured document based on the first set of vectors, the second set of vectors, and the updated first portion of the structured document.

14. The one or more non-transitory, machine-readable media of embodiment 13, wherein: obtaining an update to the first portion of the structured document comprises obtaining an update to a first sub-portion of the first portion; and updating the second portion comprises: determining a second sub-portion of the second portion based on a mapping between the first sub-portion and the second sub-portion; generating additional text based on the updated first sub-portion; and updating the second sub-portion to comprise the additional text.

15. The method of any of embodiments 1 to 14, wherein the set of documents is a first set of documents, further comprising: determining a first set of text portions based on a second set of documents, wherein each respective text portion of the first set of text portions is obtained from a respective training document of the second set of documents; determining a second set of text portions based on a third set of documents, wherein each respective text portion of the second set of text portions is obtained from a respective training document of the third set of documents; training a first set of neural network layers based on the first set of text portions; training a second set of neural network layers based on the second set of text portions, wherein: generating the first portion of the structured document comprises generating the first portion of the structured document using the first set of neural network layers; and generating the second portion of the structured document comprises generating the second portion of the structured document using the second set of neural network layers.

16. The method of any of embodiments 1 to 15, wherein the set of documents is a first set of documents, the method further comprising: obtaining a second set of documents categorized with a domain category; training a generative language model associated with the domain category based on the second set of documents; determining a candidate category based on the first text using a categorization machine learning model; and determining a match between the candidate category and the domain category, wherein generating the second portion of the structured document comprises selecting the generative language model in response to detecting the match between the candidate category and the domain category.

17. The method of any of embodiments 1 to 16, further comprising: obtaining a feedback value indicating that a first text segment of the structured document is incorrect; generating a plurality of text segments based on the first text segment; determining whether at least one text segment of the plurality of text segments is found in a first document of the set of documents; and in response to a determination that at least one text segment of the plurality of text segments is found in the first document, retraining a generative language model based on a modified set of text that does not include text of the first document.

18. The method of any of embodiments 1 to 17, wherein: determining the first region comprises determining a first convex hull based on the first set of vectors; determining the second region comprises determining a second convex hull based on the second set of vectors; and the method further comprise determining the third region by: determining an intersecting region of the first region and the second region; determining a complement of the intersecting region within the first region.

19. The method of any of embodiments 1 to 18, wherein generating the first portion of the structured document comprises generating a plurality of text segments by: generating a first text segment of the plurality of text segments based on the second set of vectors; and generating a second text segment of the plurality of text segments based on the first text segment.

20. The method of any of embodiments 1 to 19, the method further comprising: segmenting a first document of the set of documents into a set of sections; and generating a sequence of categories based on the set of sections using a classification machine learning model, wherein generating the second portion of the structured document comprises generating the second portion of the structured document based on the sequence of categories.

21. The method of any of embodiments 1 to 20, wherein the structured document comprises a patent application, and wherein the first portion of the structured document is in a claims portion of a patent application.

22. The method of any of embodiments 1 to 21, wherein the structured document comprises a contract.

23. One or more tangible, non-transitory, machine-readable media storing instructions that, when executed by a set of processors, cause the set of processors to effectuate operations comprising those of any of embodiments 1 to 22.

24. A system comprising: a set of processors and a set of media storing computer program instructions that, when executed by the set of processors, cause the set of processors to effectuate operations comprising those of any of embodiments 1 to 22.

What is claimed is:

1. A system for generating document text by determining a complement of embedding sets in an embedding space, the system comprising one or more non-transitory, machine-readable media storing program instructions that, when executed by one or more processors, cause the one or more processors to perform operations comprising:

obtaining a related set of documents related an initial text summarization of a meeting transcript by generating a database query for the related set of documents based on the initial text summarization;

generating (i) summarization embeddings based on the initial text summarization by providing, as input, the initial text summarization to a encoder model and (ii) corpora-derived embeddings based on the related set of documents by providing, as input, text of the related set of documents to the encoder model;

determining a first region in an embedding space based on the summarization embeddings and a second region in the embedding space based on the corpora-derived embeddings;

determining, in the embedding space, a complement region that is within the first region and not within the second region;

generating a first portion of a structured document by providing, as input, the summarization embeddings and a candidate set of embeddings in the complement region to a generative language model; and generating a second portion of the structured document by providing, as input, the summarization embeddings, the corpora-derived embeddings, and embeddings derived from the first portion of the structured document to the generative language model.

2. A method comprising:

obtaining a set of documents by generating a database query based on a first text;

generating a first set of vectors in an embedding space based on the first text by providing the first text to an encoder model and a second set of vectors based on text of the set of documents by providing the text of the set of documents to the encoder model;

determining a first region in the embedding space based on the first set of vectors and a second region in the embedding space based on the second set of vectors;

generating a first portion of a structured document based on the first set of vectors and a third set of vectors in a third region of the embedding space, wherein the third region is within the first region and not within the second region; and generating a second portion of the structured document based on the first set of vectors, the second set of vectors, and the first portion of the structured document.

3. The method of claim 2, wherein generating the first portion of the structured document comprises generating an enumerated sequence of text segments by:

generating a first text segment of the enumerated sequence of text segments based on the first portion of the structured document; and generating a second text segment of the enumerated sequence of text segments based on the first text segment.

4. The method of claim 2, further comprising:

obtaining an audio recording of a meeting;

generating a meeting transcript based on the audio recording;

obtaining an indicator of a first transcript portion of the meeting transcript; and generating the first text based on the meeting transcript by updating a weight value associated with the first transcript portion of the meeting transcript.

5. The method of claim 4, further comprising obtaining a priority indicator of a participant identified by a participant identifier, wherein:

generating the meeting transcript comprises generating the first transcript portion based on an associated portion of the audio recording; and obtaining the indicator of the first transcript portion comprises generating the indicator based on data indicating that the participant is speaking while the associated portion of the audio recording is being recorded.

6. The method of claim 4, wherein the indicator is a first indicator of a first type, further comprising:

obtaining a second indicator of a second transcript portion of the meeting transcript, wherein the second indicator is of a second type different from the first type; and generating a redacted meeting transcript, wherein the redacted meeting transcript does not comprise the second transcript portion;

wherein generating the first text based on the meeting transcript comprises generating the first text based on the redacted meeting transcript.

7. The method of claim 2, further comprising:

segmenting a first document of the set of documents into a set of sections; and generating a sequence of structural categories by providing each respective section of the set of sections to a classification machine learning model to determine a respective structural category of the sequence of structural categories, wherein generating the second portion of the structured document comprises determining a structure of the structured document based on the sequence of structural categories.

8. The method of claim 7, further comprising:

generating a first visual representation based on a first structural category associated with a first element of the sequence of structural categories; and generating a second figure based on a second structural category associated with a second element of the sequence of structural categories.

9. The method of claim 2, wherein:

obtaining the set of documents comprises:

ranking a set of domain categories based on the first text to determine a ranking indicating similarity, wherein the set of domain categories comprises a first domain category and a second domain category;

selecting a first document based on the first domain category;

determining a first subset of the second set of vectors based on the first document; and selecting a second document based on the second domain category; and determining a candidate region in the embedding space of the second document based on the first set of vectors; and determining a second subset of the second set of vectors based on the candidate region.

10. The method of claim 2, wherein providing the text of the set of documents to the encoder model comprises determining the text based on the set of documents, and wherein the set of documents comprises a first document and a second document, further comprising:

determining a result indicating that a candidate identifier matches with an identifier of the second document, wherein the candidate identifier is indicated in metadata of the first document; and determining a candidate text difference between the first document and the second document, wherein determining the text of the set of documents comprises determining the text of the set of documents based on the candidate text difference.

11. One or more non-transitory, machine-readable media storing program instructions that, when executed by one or more processors, perform operations comprising:

obtaining a set of documents by generating a database query based on a first text;

generating a first set of vectors in an embedding space based on the first text and a second set of vectors in the embedding space based on text of the set of documents;

determining a first region in the embedding space based on the first set of vectors and a second region in the embedding space based on the second set of vectors;

generating a first portion of a structured document based on the first set of vectors and a third set of vectors in a third region that is within the first region and not within the second region; and generating a second portion of the structured document based on the first set of vectors, the second set of vectors, and the first portion of the structured document.

12. The one or more non-transitory, machine-readable media of claim 11, wherein generating the second set of vectors comprises:

obtaining initial text based on the set of documents comprising a first document and a second document, wherein a first text portion of the initial text is obtained based on the first document, and wherein a second text portion of the initial text is obtained based on the second document, and wherein the first document and the second document are not identical;

determining that the first text portion is a duplicate of the second document; and reducing a first weight associated with text obtained from the first document, wherein generating the first set of vectors comprises providing the first weight to an encoder model, wherein generating the second set of vectors comprises generating the second set of vectors using the encoder model.

13. The one or more non-transitory, machine-readable media of claim 11, the operations further comprising:

obtaining an update to the first portion of the structured document; and updating the second portion of the structured document based on the first set of vectors, the second set of vectors, and the updated first portion of the structured document.

14. The one or more non-transitory, machine-readable media of claim 13, wherein:

obtaining an update to the first portion of the structured document comprises obtaining an update to a first sub-portion of the first portion; and updating the second portion comprises:

determining a second sub-portion of the second portion based on a mapping between the first sub-portion and the second sub-portion;

generating additional text based on the updated first sub-portion; and updating the second sub-portion to comprise the additional text.

15. The one or more non-transitory, machine-readable media of claim 11, wherein the set of documents is a first set of documents, the operations further comprising:

determining a first set of text portions based on a second set of documents, wherein each respective text portion of the first set of text portions is obtained from a respective training document of the second set of documents;

determining a second set of text portions based on a third set of documents, wherein each respective text portion of the second set of text portions is obtained from a respective training document of the third set of documents; and training a first set of neural network layers based on the first set of text portions;

training a second set of neural network layers based on the second set of text portions, wherein:

generating the first portion of the structured document comprises generating the first portion of the structured document using the first set of neural network layers; and generating the second portion of the structured document comprises generating the second portion of the structured document using the second set of neural network layers.

16. The one or more non-transitory, machine-readable media of claim 11, wherein the set of documents is a first set of documents, the operations further comprising:

obtaining a second set of documents categorized with a domain category;

training a generative language model associated with the domain category based on the second set of documents;

determining a candidate category based on the first text using a categorization machine learning model; and determining a match between the candidate category and the domain category, wherein generating the second portion of the structured document comprises selecting the generative language model in response to detecting the match between the candidate category and the domain category.

17. The one or more non-transitory, machine-readable media of claim 11, the operations further comprising:

obtaining a feedback value indicating that a first text segment of the structured document is incorrect;

generating a plurality of text segments based on the first text segment;

determining whether at least one text segment of the plurality of text segments is found in a first document of the set of documents; and in response to a determination that at least one text segment of the plurality of text segments is found in the first document, retraining a generative language model based on a modified set of text that does not include text of the first document.

18. The one or more non-transitory, machine-readable media of claim 11, wherein:

determining the first region comprises determining a first convex hull based on the first set of vectors;

determining the second region comprises determining a second convex hull based on the second set of vectors; and the operations further comprise determining the third region by:

determining an intersecting region of the first region and the second region; and determining a complement of the intersecting region within the first region.

19. The one or more non-transitory, machine-readable media of claim 11, wherein generating the first portion of the structured document comprises generating a plurality of text segments by:

generating a first text segment of the plurality of text segments based on the second set of vectors; and generating a second text segment of the plurality of text segments based on the first text segment.

20. The one or more non-transitory, machine-readable media of claim 11, the operations further comprising:

segmenting a first document of the set of documents into a set of sections; and generating a sequence of categories based on the set of sections using a classification machine learning model, wherein generating the second portion of the structured document comprises generating the second portion of the structured document based on the sequence of categories.

\* \* \* \* \*